United States Patent
Akaiwa et al.

(10) Patent No.: US 10,623,613 B2
(45) Date of Patent: Apr. 14, 2020

(54) CAMERA MODULE AND METHOD FOR PRODUCING THE SAME

(71) Applicant: SMK Corporation, Tokyo (JP)

(72) Inventors: Taku Akaiwa, Kanagawa (JP); Nobuyuki Mano, Tokyo (JP)

(73) Assignee: SMK Corporation, Tokyo (JP)

( * ) Notice: Subject to any disclaimer, the term of this patent is extended or adjusted under 35 U.S.C. 154(b) by 22 days.

(21) Appl. No.: 16/019,515

(22) Filed: Jun. 26, 2018

(65) Prior Publication Data

US 2019/0007586 A1   Jan. 3, 2019

(30) Foreign Application Priority Data

Jun. 28, 2017 (JP) ................... 2017-126134

(51) Int. Cl.
*H04N 5/225* (2006.01)
*G03B 17/02* (2006.01)
*G03B 43/00* (2006.01)
*G03B 17/12* (2006.01)

(52) U.S. Cl.
CPC .......... *H04N 5/2252* (2013.01); *G03B 17/02* (2013.01); *G03B 17/12* (2013.01); *G03B 43/00* (2013.01); *H04N 5/2254* (2013.01); *G03B 2217/002* (2013.01)

(58) Field of Classification Search
CPC .... H04N 5/2252; H04N 5/2254; G03B 17/12; G03B 43/00; G03B 17/02; G03B 2217/002
See application file for complete search history.

(56) References Cited

U.S. PATENT DOCUMENTS

| 2005/0258502 | A1* | 11/2005 | Kong | H01L 27/14618 257/433 |
| 2008/0001727 | A1* | 1/2008 | Ohsumi | H04N 5/2253 340/436 |
| 2009/0160998 | A1* | 6/2009 | Fukamachi | H04N 5/2253 348/340 |
| 2010/0151192 | A1 | 6/2010 | Saito | |
| 2012/0086784 | A1* | 4/2012 | Oh | H04N 5/2251 348/47 |
| 2015/0273799 | A1* | 10/2015 | Takama | H04N 5/2257 348/373 |
| 2018/0063388 | A1* | 3/2018 | Hsu | H04N 5/2257 |

FOREIGN PATENT DOCUMENTS

| JP | 2007174358 A | 7/2007 |
| JP | 2014066921 A | 4/2014 |
| WO | 2017187690 A1 | 11/2017 |

OTHER PUBLICATIONS

Office Action issued for counterpart Japanese Application 2017-126134, issued by the Japan Patent Office dated Mar. 27, 2018.

* cited by examiner

*Primary Examiner* — Jason A Flohre

(57) ABSTRACT

A camera module with excellent strength is provided. A camera module includes a housing to which a lens unit is attached and a substrate having a certain positional relationship with the lens unit and supported by the housing, where the housing includes an adhesive agent pool provided to a first main plane of the substrate with a certain opposing space and an open end of an adhesive agent path including the opposing space that is provided to a side of a second main plane of the substrate.

6 Claims, 25 Drawing Sheets

CAMERA MODULE AND METHOD FOR PRODUCING THE SAME

CROSS REFERENCE TO RELATED APPLICATION

The contents of the following Japanese patent application are incorporated herein by reference,
Japanese Patent Application No. 2017-126134 filed on Jun. 28, 2017.

FIELD

The present invention relates to a camera module and a method for producing a camera module.

BACKGROUND

In a process of producing a camera module, positional adjustment is performed for optically positioning an imaging element. Because such problems as misalignment of position of image center against lens optical axis, misalignment of rotation of image against camera reference plane such as camera bottom, and mismatch of focus against lens occur if position is not accurately adjusted, high accuracy is required for positional adjustment. In the technique disclosed in Patent Literature 1 listed below, a lens holder and a sensor substrate are fixed to each other by adhesive agent after performing six-axes adjustment for aligning optical axis between a lens and an image sensor. Note that, "six-axes adjustment" means adjustment by translation of X-axis, Y-axis, and Z-axis directions, and by rotation around each axis.

PRIOR ART DOCUMENT

Patent Literature

Patent Literature 1: JP-A-2014-066921

SUMMARY

In such a process for producing a camera module, it is preferable that a housing and a substrate which have been positioned with high accuracy be surely bonded and fixed to each other without complicated process while relative positional relationship thereof is maintained. Then, it is preferable that the camera module thus produced have excellent structure in terms of strength.

A purpose of an aspect of the present invention is to provide a camera module excellent in terms of strength and a method for producing such a camera module.

In order to solve the problems described above, an aspect of the present invention is, for example, a camera module that includes:

a housing to which a lens unit is attached; and a substrate mounting an imaging element on a first main plane and supported by the housing so that the imaging element is irradiated with a light taken via the lens unit and the imaging element has a certain positional relationship with an optical axis of the lens unit, in which the housing includes:

an adhesive agent pool having a plane provided substantially parallel to the first main plane of the substrate and provided to the first main plane with a certain first opposing space; and a wall provided in a direction substantially perpendicular to the plane of the adhesive agent pool and having a concave portion that connects to the first opposing space and makes a part of an adhesive agent path including the first opposing space, the concave portion forming an open end of the adhesive agent path provided to a second main plane side of the substrate, and the camera module further includes an adhesion part provided to at least the first opposing space and bonding the housing and the substrate.

In addition, an aspect of the present invention is a method for producing a camera module comprising a housing to which a lens unit is attached and a substrate mounting an imaging element on a first main plane and supported by the housing so that the imaging element is irradiated with a light taken via the lens unit and the imaging element has a certain positional relationship with an optical axis of the lens unit, the housing including an adhesive agent pool having a plane provided substantially parallel to the first main plane of the substrate and provided to the first main plane with a certain opposing space and a wall provided in a direction substantially perpendicular to the plane of the adhesive agent pool and having a concave portion that connects to the opposing space and makes a part of an adhesive agent path including the opposing space, the concave portion forming an open end of the adhesive agent path provided to a side of a second main plane of the substrate, the camera module further comprising an adhesion part provided to at least the opposing space and bonding the housing and the substrate, that includes:

adjusting relative positional relationship between the housing and the substrate; and injecting adhesive agent from an open end of the adhesive agent path and injecting adhesive agent from the open end toward the opposing space to bond the housing and the substrate.

According to an aspect of the present invention, a camera module excellent in terms of strength can be provided. In addition, a camera module excellent in terms of strength can be produced without complicated steps. Note that, interpretation of an aspect of the present invention shall not be limited by effects exemplified herein.

DESCRIPTION OF EMBODIMENTS

The embodiments of an aspect of the present invention will be described below with reference to the drawings. The description will be made in the following order.
<1. First Embodiment>
<2. Second Embodiment>
<3. Modification>

The embodiments described below exemplify configurations for embodying technological concepts of aspects of the present invention, but the present invention is not limited to the exemplified configurations. Note that, parts in the claims are not limited to those in the embodiments. Specifically, descriptions of dimension, material, shape, relative placement, and direction such as up, down, right, and left described in the embodiments do not limit the scope of the present invention to such descriptions unless specifically noted, but are mere examples. Note that, size, positional relationship, and the like of the members illustrated in figures are sometimes exaggerated to clarify the description, and only parts of the reference signs are sometimes shown in the figures in order to avoid complicated illustration of the figures. Moreover, in the following description, the same titles and reference signs show the same or similar part, and repetitive descriptions are omitted as appropriate. Furthermore, each element making up aspects of the present invention may be an aspect constituting a plurality of elements with the same part and using the plurality of elements in the same part, and function of one part may be shared by a plurality of parts on the contrary.

1. First Embodiment

[Schematic Configuration of Camera Module]

Figure 1:
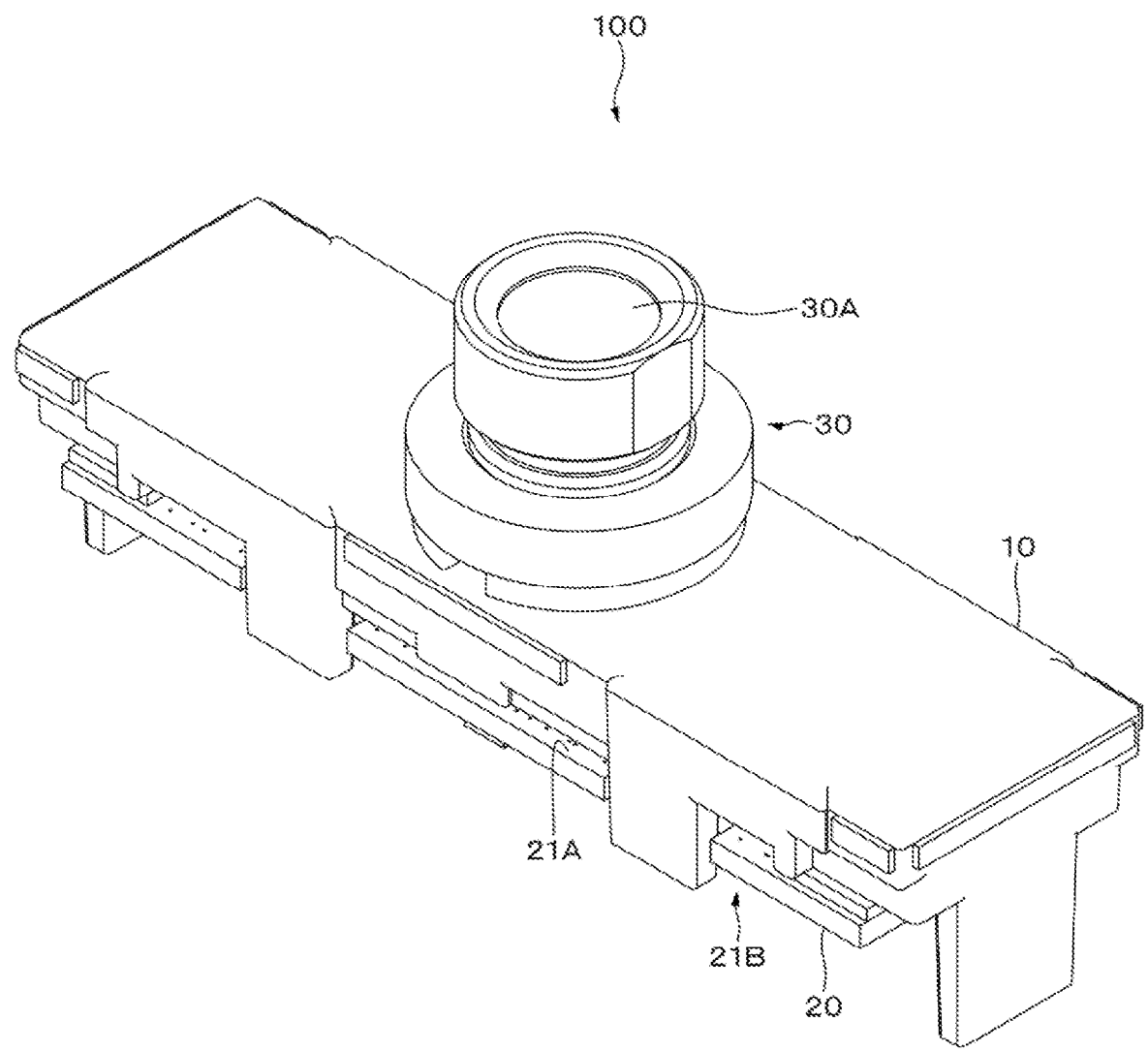
FIG. 1 is a perspective view illustrating a configuration example of a camera module according to the first embodiment.

FIG. 1 is a perspective view illustrating a camera module (camera module 100) according to the first embodiment. The camera module 100 schematically includes a housing (housing 10) and a substrate (substrate 20). A lens unit 30 including an objective lens 30A is attached to the housing 10. An imaging element and other components are mounted on the substrate 20. The substrate 20 is supported by the housing 10 so as to have a certain positional relationship with the lens unit 30.

For example, the camera module 100 is produced as follows. The position of the housing 10 and the substrate 20 is adjusted so that the objective lens 30A and the imaging element have a certain positional relationship, or more specifically, so that the optical axis of the light taken by the objective lens 30A hits the predetermined position (for example, near the center) of the imaging element. The position is adjusted by a known six-axes adjustment device, for example. After the position of the housing 10 and the substrate 20 is adjusted, the housing 10 and the substrate 20 are bonded and fixed to each other by adhesive agent such as epoxy adhesive agent while the positional relationship between the objective lens 30A and the imaging element is maintained.

[Housing]

Figure 2A:
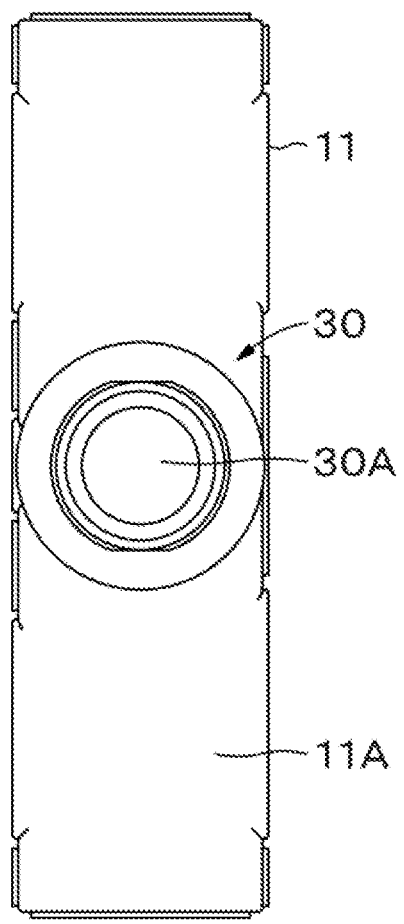
FIG. 2A is a front view illustrating a housing according to the first embodiment.
Figure 2B:
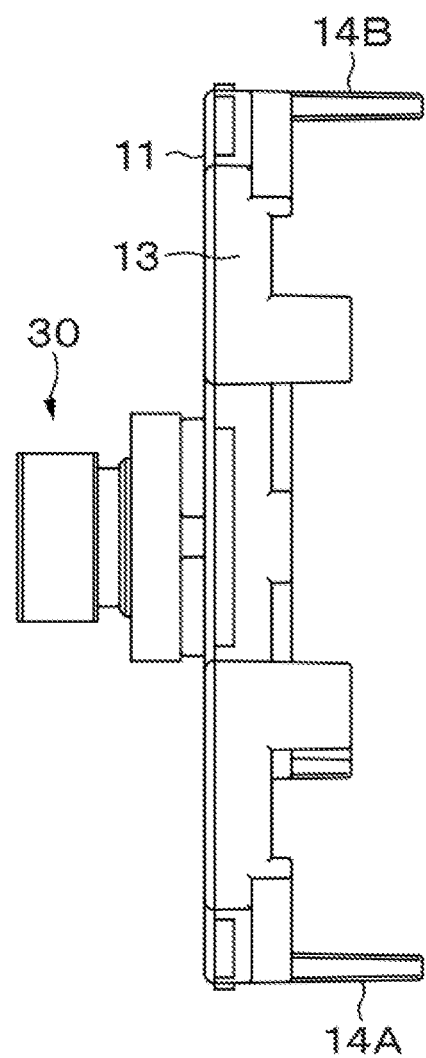
FIG. 2B is a right side view illustrating the housing according to the first embodiment.
Figure 2C:
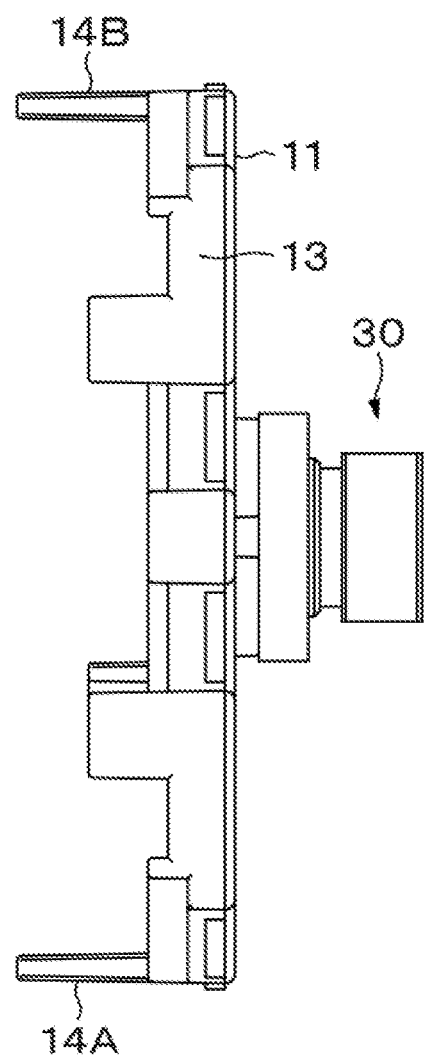
FIG. 2C is a left side view illustrating the housing according to the first embodiment.
Figure 2D:
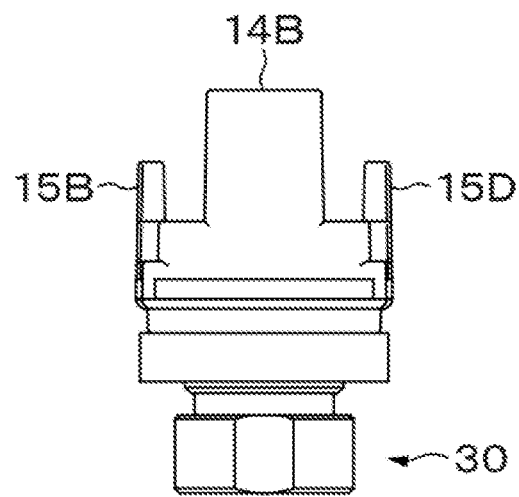
FIG. 2D is a top view illustrating the housing according to the first embodiment.
Figure 2E:
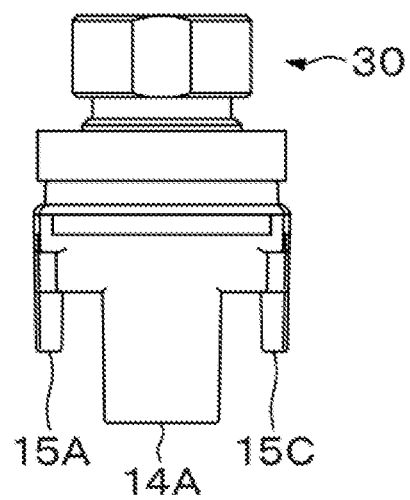
FIG. 2E is a bottom view illustrating the housing according to the first embodiment.
Figure 3A:
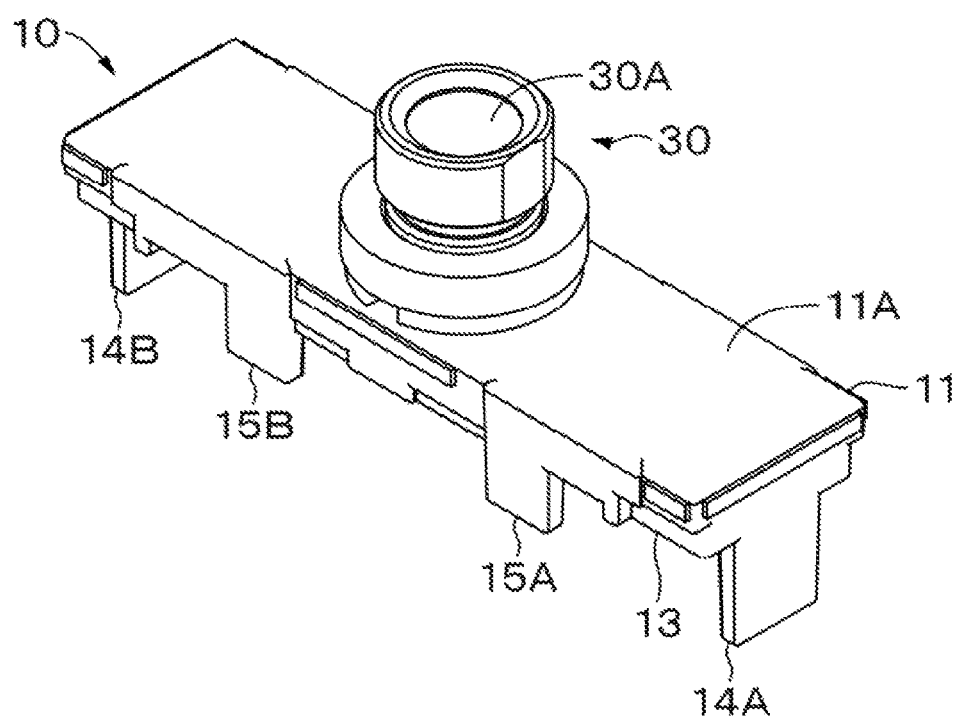
FIG. 3A is a perspective view illustrating the housing according to the first embodiment seen from an angle.
Figure 3B:
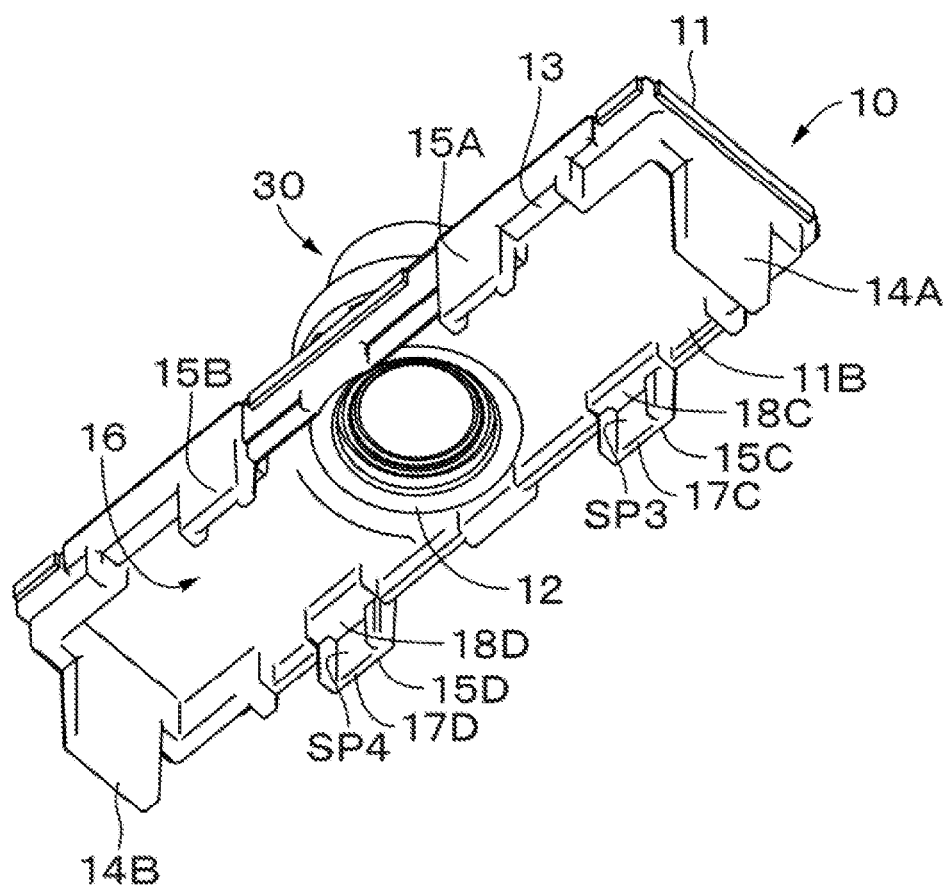
FIG. 3B is another perspective view illustrating the housing according to the first embodiment seen from another angle.
Figure 3C:
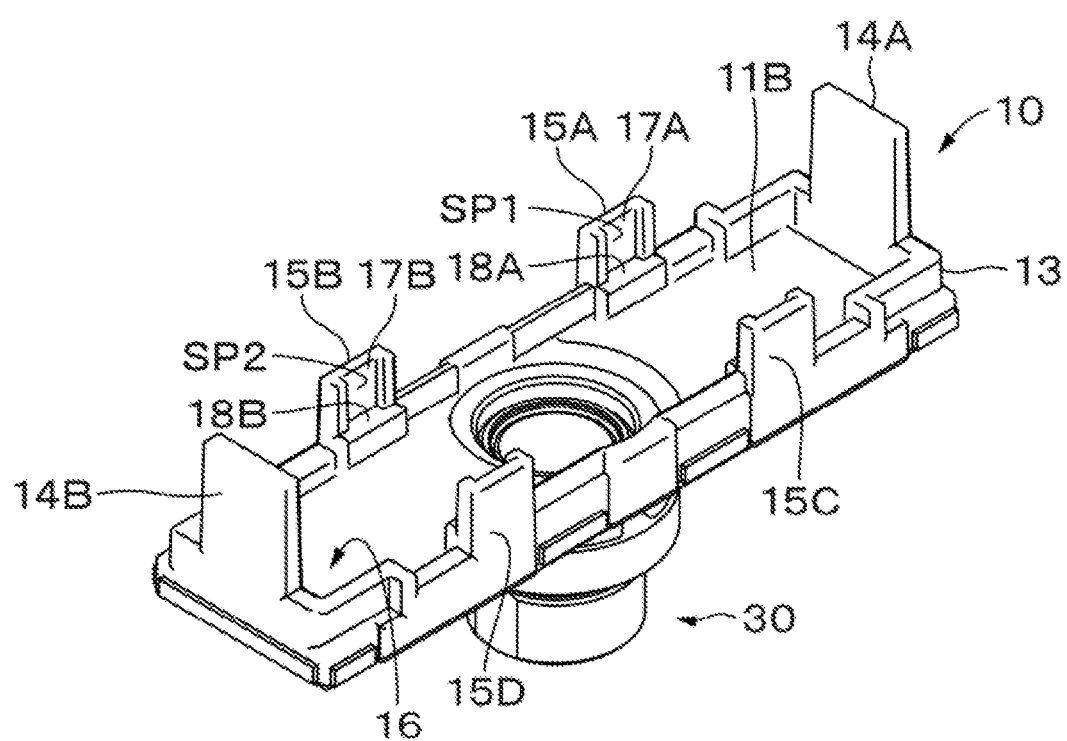
FIG. 3C is another perspective view illustrating the housing according to the first embodiment seen from another angle.
Figure 4A:
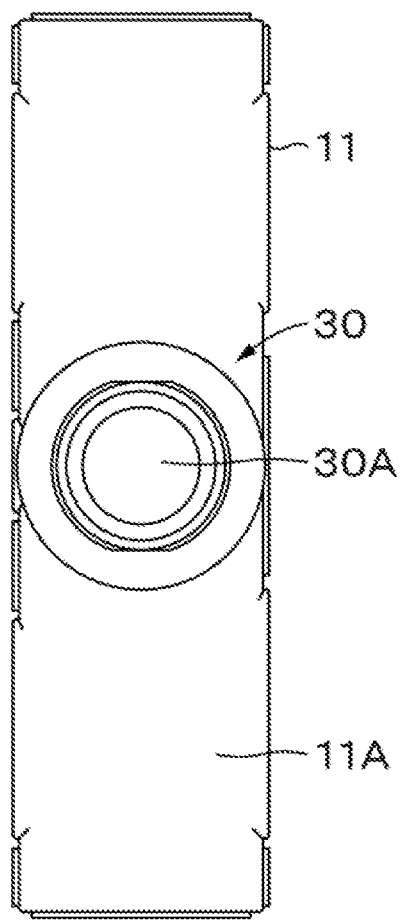
FIG. 4A is a front view illustrating the camera module according to the first embodiment.
Figure 4B:
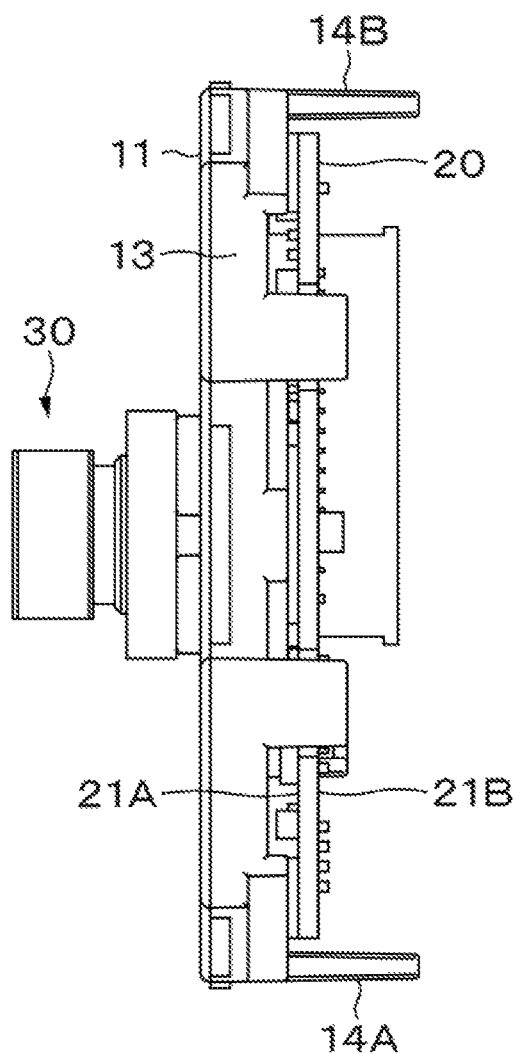
FIG. 4B is a right side view illustrating the camera module according to the first embodiment.
Figure 4C:
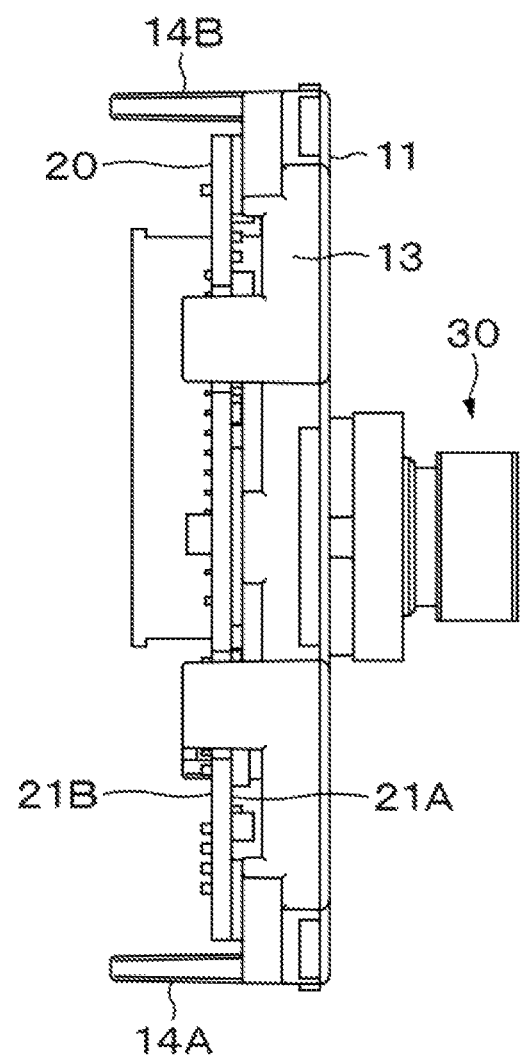
FIG. 4C is a left side view illustrating the camera module according to the first embodiment.
Figure 4D:
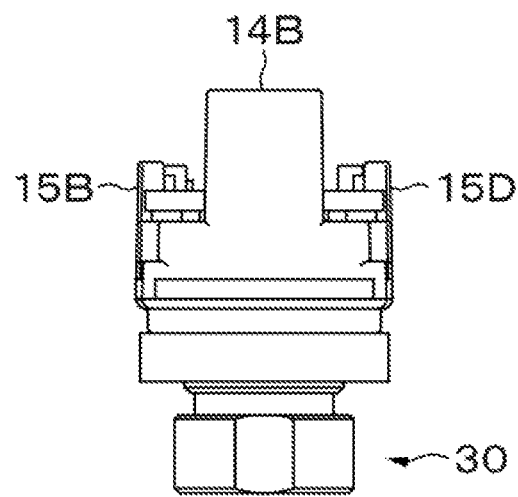
FIG. 4D is a top view illustrating the camera module according to the first embodiment.
Figure 4E:
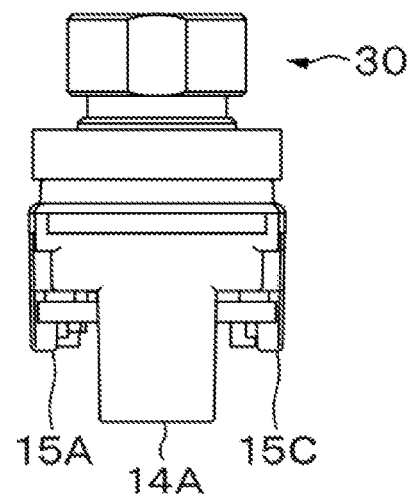
FIG. 4E is a bottom view illustrating the camera module according to the first embodiment.

Next, example of the configuration of the housing 10 will be described in detail with reference to FIGS. 2A to 2E and FIGS. 3A to 3C. FIG. 2A is a front view illustrating the housing 10, FIG. 2B is a right side view illustrating the housing 10, FIG. 2C is a left side view illustrating the housing 10, FIG. 2D is a top view illustrating the housing 10, and FIG. 2E is a bottom view illustrating the housing 10. In addition, FIGS. 3A to 3C are perspective views illustrating the housing 10 seen from the different angles.

The housing 10 is formed by injection molding of metal die-cast or resin, for example. The housing 10 has a substantially rectangular and thin plate portion 11 as seen from the top. Note that, in the present embodiment, the main plane of the plate portion 11 where the lens unit 30 projects is referred to as a front plane 11A and the opposite main plane is referred to as a back plane 11B.

A through hole 12 penetrating the plate portion 11 is provided near the center of the plate portion 11 and the lens unit 30 is attached around the through hole 12 of the front plane 11A. The light taken via the lens unit 30 is guided to the back plane 11B side via the through hole 12 and an imaging element disposed to the back plane 11B side is irradiated with the light.

A frame-like step 13 with downward convex (direction opposite to the direction of projection of the lens unit 30) is provided at the periphery of the back plane 11B of the plate portion 11. Walls 14A and 14B projecting downward with respect to the step 13 are provided to stand in the short direction of the step 13. Walls 15A and 15B projecting downward with respect to the step 13 are provided to stand in one longitudinal direction of the step 13. The walls 15A and 15B are provided with substantially constant intervals in one longitudinal direction of the step 13. Walls 15C and 15D projecting downward with respect to the step 13 are provided to stand in another longitudinal direction of the step 13. The walls 15C and 15D are provided with substantially constant intervals in another longitudinal direction of the step 13. The area sectioned by the walls 14A, 14B, 15A, 15B, 15C, and 15D functions as a substrate housing 16 for housing the substrate 20.

For example, the wall 15A has a U-shape cross section in the horizontal direction (plane direction parallel to the back plane 11B). With the shape of the wall 15A, a space SP1 sectioned by the wall 15A and extending in the direction substantially orthogonal to the back plane 11B of the plate portion 11 is formed. One end of the space SP1 is an open end, and in the present embodiment, this open end functions as an adhesive agent injection portion 17A for injecting adhesive agent. On the other hand, an adhesive agent pool 18A with a plane substantially parallel to the back plane 11B is provided to the other end of the space SP1. An opposing space is formed between one main plane of the substrate 20 and the adhesive agent pool 18A while certain positional relationship is maintained between the housing 10 and the substrate 20. The space SP1 connects to the opposing space.

The wall 15B has a U-shape cross section in the horizontal direction. With the shape of the wall 15B, a space SP2 sectioned by the wall 15B and extending in the direction substantially orthogonal to the back plane 11B of the plate portion 11 is formed. One end of the space SP2 is an open end, and in the present embodiment, this open end functions as an adhesive agent injection portion 17B for injecting adhesive agent. On the other hand, an adhesive agent pool 18B with a plane substantially parallel to the back plane 11B is provided to the other end of the space SP2. An opposing space is formed between one main plane of the substrate 20 and the adhesive agent pool 18B while certain positional relationship is maintained between the housing 10 and the substrate 20. The space SP2 connects to the opposing space.

The wall 15C has a U-shape cross section in the horizontal direction. With the shape of the wall 15C, a space SP3 sectioned by the wall 15C and extending in the direction substantially orthogonal to the back plane 11B of the plate portion 11 is formed. One end of the space SP3 is an open end, and in the present embodiment, this open end functions as an adhesive agent injection portion 17C for injecting adhesive agent. On the other hand, an adhesive agent pool 18C with a plane substantially parallel to the back plane 11B is provided to the other end of the space SP3. An opposing space is formed between one main plane of the substrate 20 and the adhesive agent pool 18C while certain positional relationship is maintained between the housing 10 and substrate 20. The space SP3 connects to the opposing space.

The wall 15D has a U-shape cross section in the horizontal direction. With the shape of the wall 15D, a space SP4 sectioned by the wall 15D and extending in the direction substantially orthogonal to the back plane 11B of the plate portion 11 is formed. One end of the space SP4 is an open end, and in the present embodiment, this open end functions as an adhesive agent injection portion 17D for injecting adhesive agent. On the other hand, an adhesive agent pool 18D with a plane substantially parallel to the back plane 11B is provided to the other end of the space SP4. An opposing space is formed between one main plane of the substrate 20 and the adhesive agent pool 18D while certain positional relationship is maintained between the housing 10 and the substrate 20. The space SP4 connects to the opposing space.

Note that the adhesive agent pools 18A, 18B, 18C, and 18D may be part of the step 13 and may be different from the step 13.

[Substrate]

The substrate 20 is thin and substantially rectangular when seen from the top. The substrate 20 has a main plane 21A serving as a first main plane and a main plane 21B serving as a second main plane (See FIG. 1). Note that, main plane in the present embodiment refers to the plane with the largest area of the substrate 20, and main plane refers to the entire plane or part thereof.

Figure 5A:
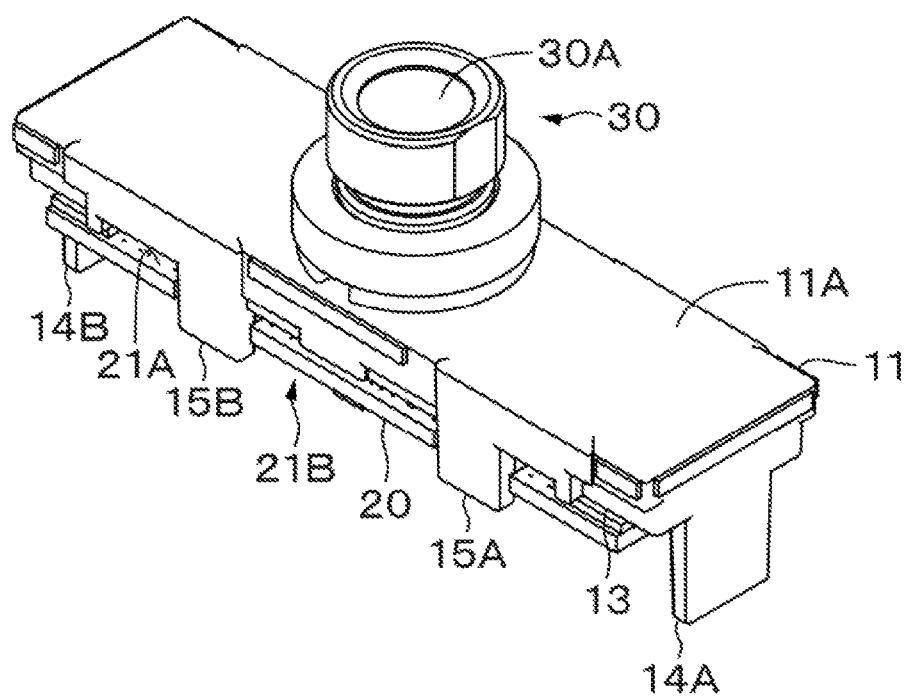
FIG. 5A is a perspective view illustrating the camera module according to the first embodiment seen from an angle.
Figure 5B:
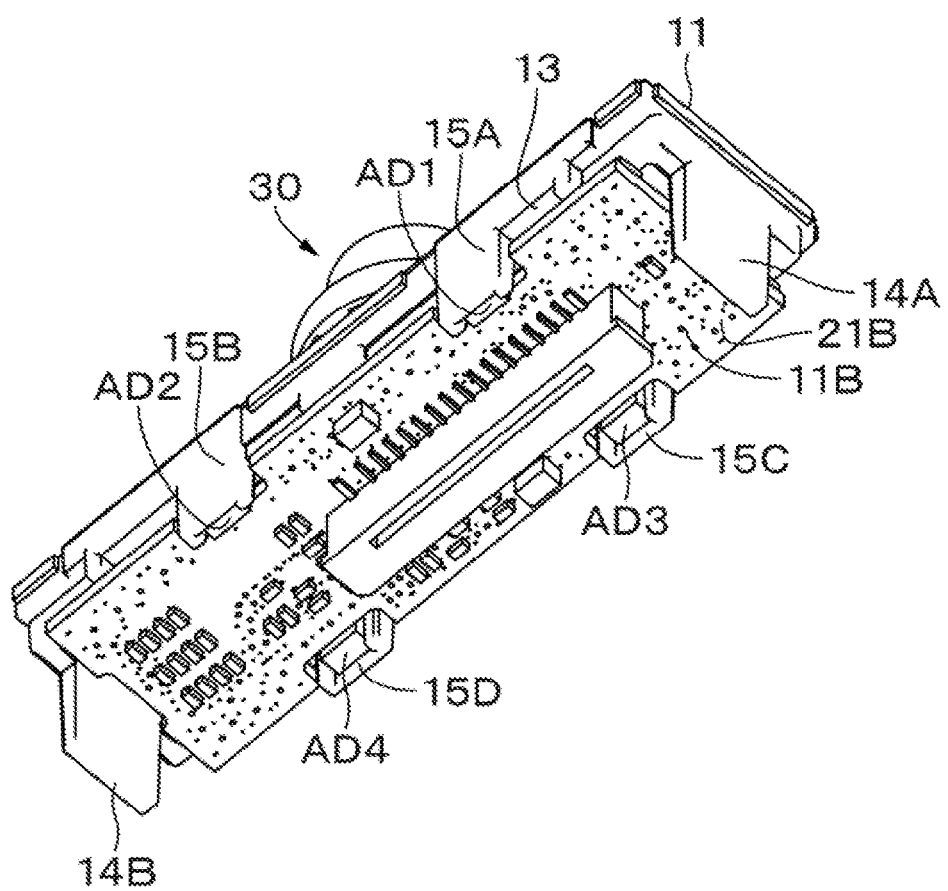
FIG. 5B is another perspective view illustrating the camera module according to the first embodiment seen from another angle.
Figure 5C:
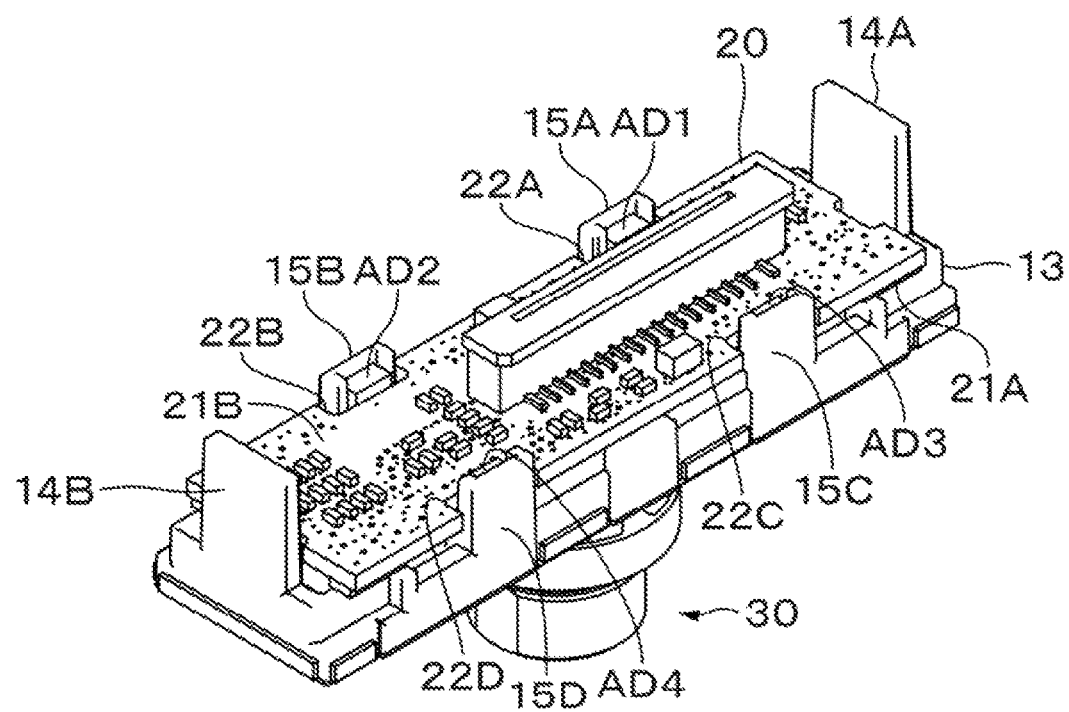
FIG. 5C is another perspective view illustrating the camera module according to the first embodiment seen from another angle.

The periphery of the substrate 20 according to the present embodiment has concave portions slightly denting inward corresponding to the wall 15. For example, concave portions 22A to 22D are formed at the locations corresponding to the walls 15A to 15D of the substrate 20 (See FIG. 5C). Accordingly, the housing 10 and the substrate 20 can be bonded to each other by adhesion part described later while the size of the substrate 20 is maintained.

At least an imaging element is mounted on the main plane 21A of the substrate 20. The substrate 20 is housed in the substrate housing 16 so that the main plane 21A and the back plane 11B of the housing 10 face each other, and the position thereof is adjusted so that the objective lens 30A and the imaging element have certain positional relationship. Then, the housing 10 and the substrate 20 are fixed to each other by adhesive agent.

[State where Housing and Substrate are Fixed]

FIGS. 4A to 4E and FIGS. 5A to 5C illustrate a state where the housing 10 and the substrate 20 are fixed to each other, that is, the camera module 100. The housing 10 and the substrate 20 are fixed to each other by an adhesion part AD. In the present embodiment, the adhesion part AD is formed by four adhesion parts AD1 to AD4. The adhesion parts AD1 to AD4 are cured adhesive agent that has been injected to the corresponding adhesive agent paths.

Figure 6A:
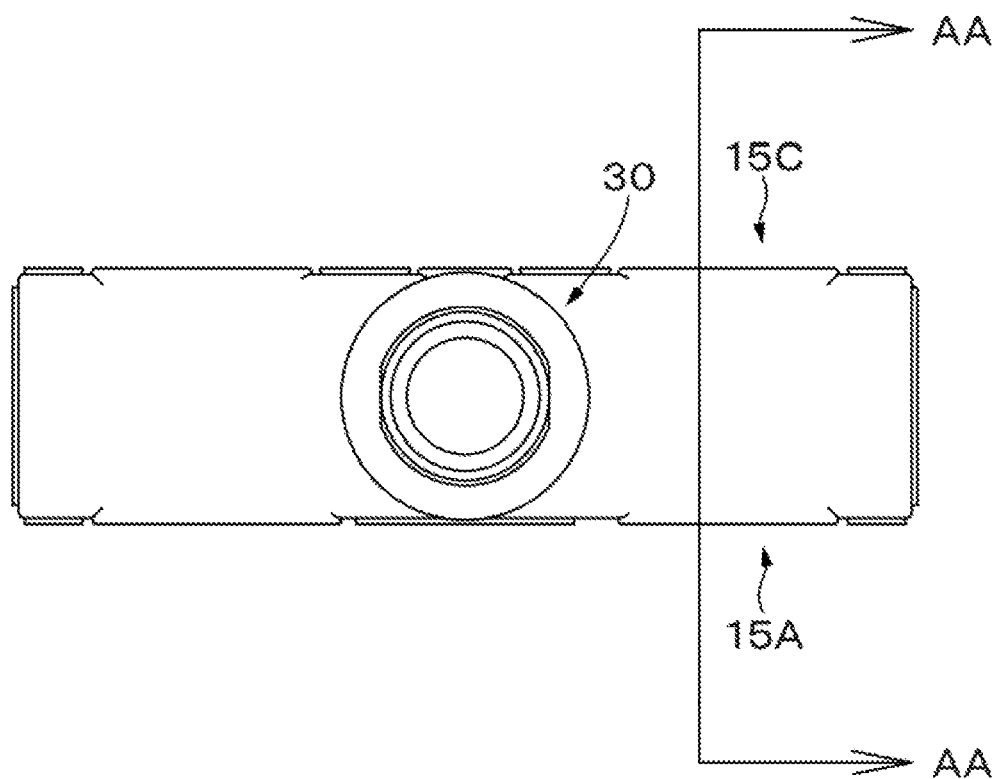
FIG. 6A shows the section line AA-AA.
Figure 6B:
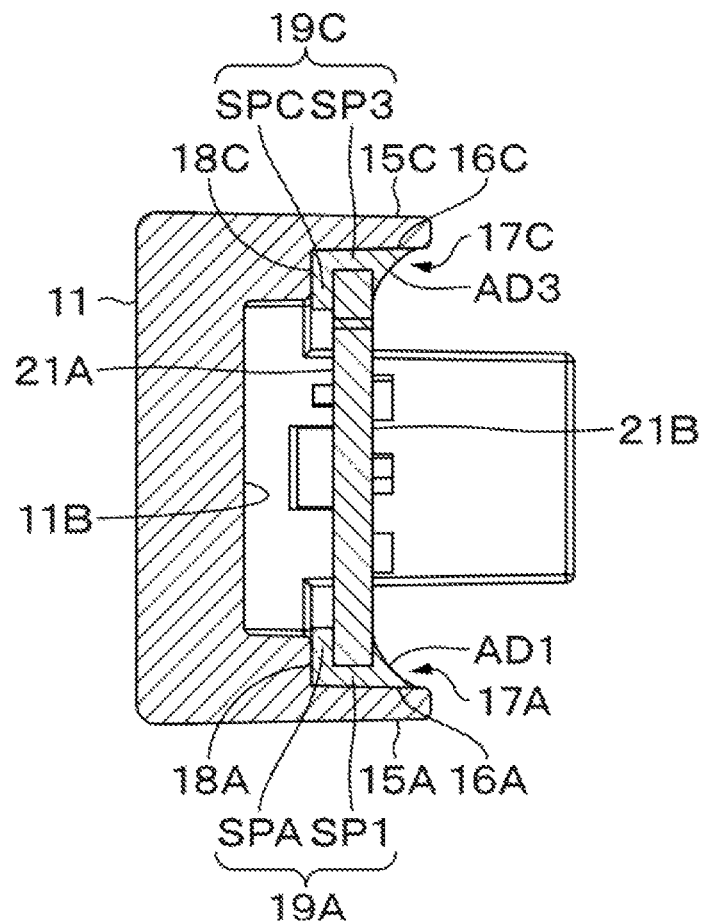
FIG. 6B is a cross-sectional view illustrating a cross section when the camera module is cut according to the section line AA-AA.

The adhesion part AD will be described with reference to FIGS. 6A and 6B. Note that, while the adhesion part AD1 will be described below, the description also applies to the adhesion parts AD2 to AD4. FIG. 6B is a cross-sectional view illustrating the housing 10 cut along the section line AA-AA along the short direction of the plate portion 11 and passing the walls 15A and 15C illustrated in FIG. 6A.

As illustrated in FIG. 6B, an opposing space SPA is formed between the main plane 21A of the substrate 20 and the adhesive agent pool 18A while the substrate 20 is housed at the predetermined position of the substrate housing 16. One end of the opposing space SPA is open and the other end is connected to the space SP1 described above. That is, in the present embodiment, an adhesive agent path 19A is formed by the opposing space SPA and the space SP1. The adhesive agent injection portion 17A as the other end (open end) of the space SP1 is disposed at the main plane 21B side, and viscous adhesive agent injected therefrom flows through the adhesive agent path 19A. The adhesion part AD1 is formed as a result of curing of the adhesive agent after the predetermined time. Note that, the main plane 21B side may be the same plane as the main plane 21B or may be upper than that plane (right direction toward plane of paper in FIG. 6B).

Next, a method for fixing the housing 10 and the substrate 20, that is, a method for producing the camera module 100, will be described. First, relative positional relationship between the housing 10 and the substrate 20 is adjusted by a known six-axes adjustment device. After adjustment of the position, adhesive agent is dropped and injected from the adhesive agent injection portions 17A to 17D to the corresponding adhesive agent paths (four locations). While adhesive agent may be injected to each part sequentially, it is preferable that it be injected at the same time because the substrate 20 may be displaced due to different timing of curing of the adhesive agent.

For example, the opposing space SPA is filled with the adhesive agent injected from the adhesive agent injection portion 17A through the space SP1. By appropriately setting the size of the adhesive agent pool 18A, it is possible to prevent the adhesive agent from being retained in the adhesive agent pool 18A by capillary action and to prevent the adhesive agent from going into optical systems such as the objective lens 30A.

While it is at least necessary to fill the opposing space SPA with adhesive agent, in the present embodiment, the adhesive agent comes over the main plane 21B of the substrate 20 by appropriately setting the amount of the adhesive agent (see FIG. 6B). That is, since the part including the main plane 21A and the main plane 21B of the substrate 20 is bonded and fixed to the housing 10 via the adhesion part AD1, it is possible to improve shock resistance against Z-axis direction (in the present embodiment, optical axis direction and right-left direction in FIG. 6B). When the adhesive agent is injected to each adhesive agent path at the same time, it is possible to easily produce the structure of the camera module with excellent shock resistance by one adhesive agent injection step.

2. Second Embodiment

Next, the second embodiment will be described. Note that, those described in the first embodiment can be applied to the second embodiment unless otherwise noted and similar or the same configurations are given the same reference signs and repetitive description will be omitted.

Figure 7A:
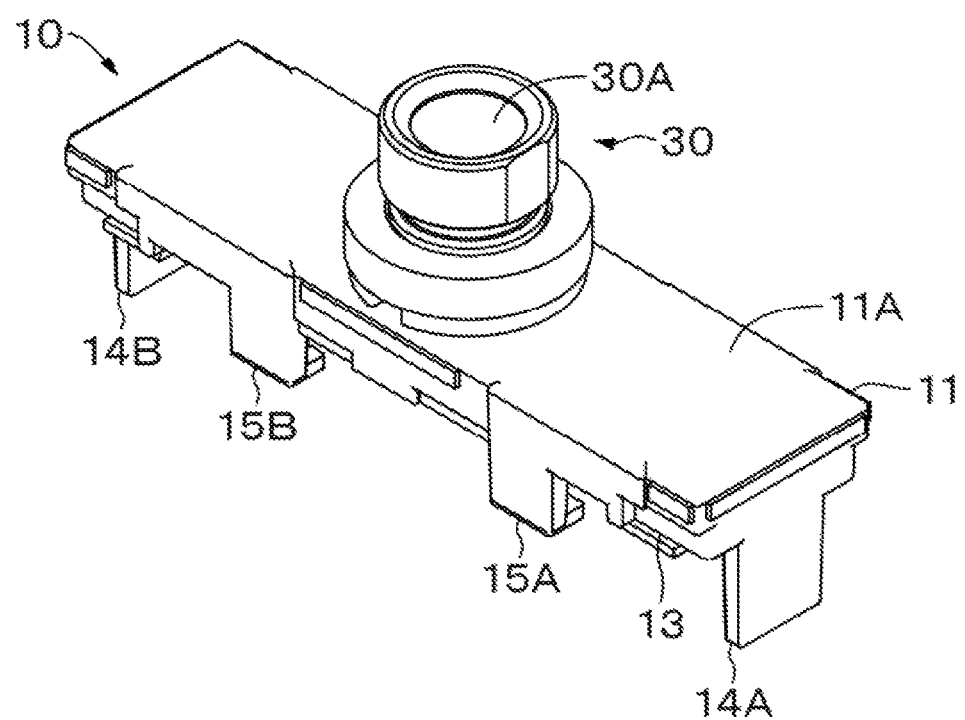
FIG. 7A is a perspective view illustrating a housing according to the second embodiment seen from an angle.
Figure 7B:
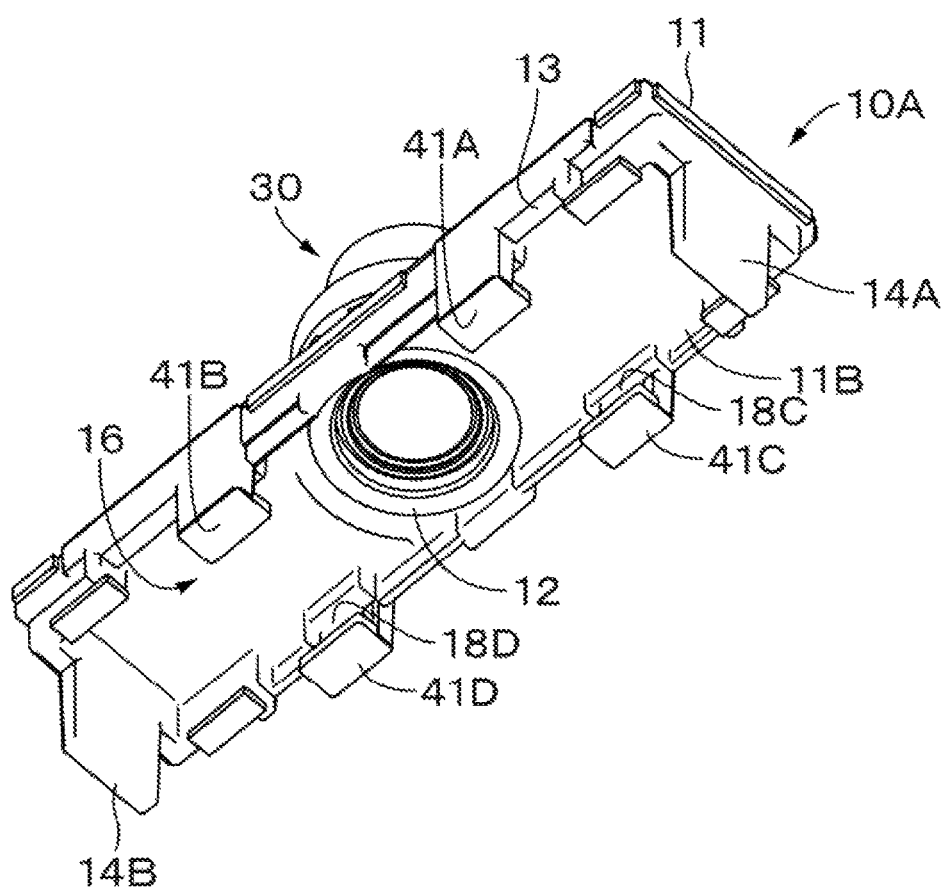
FIG. 7B is another perspective view illustrating the housing according to the second embodiment seen from another angle.
Figure 7C:
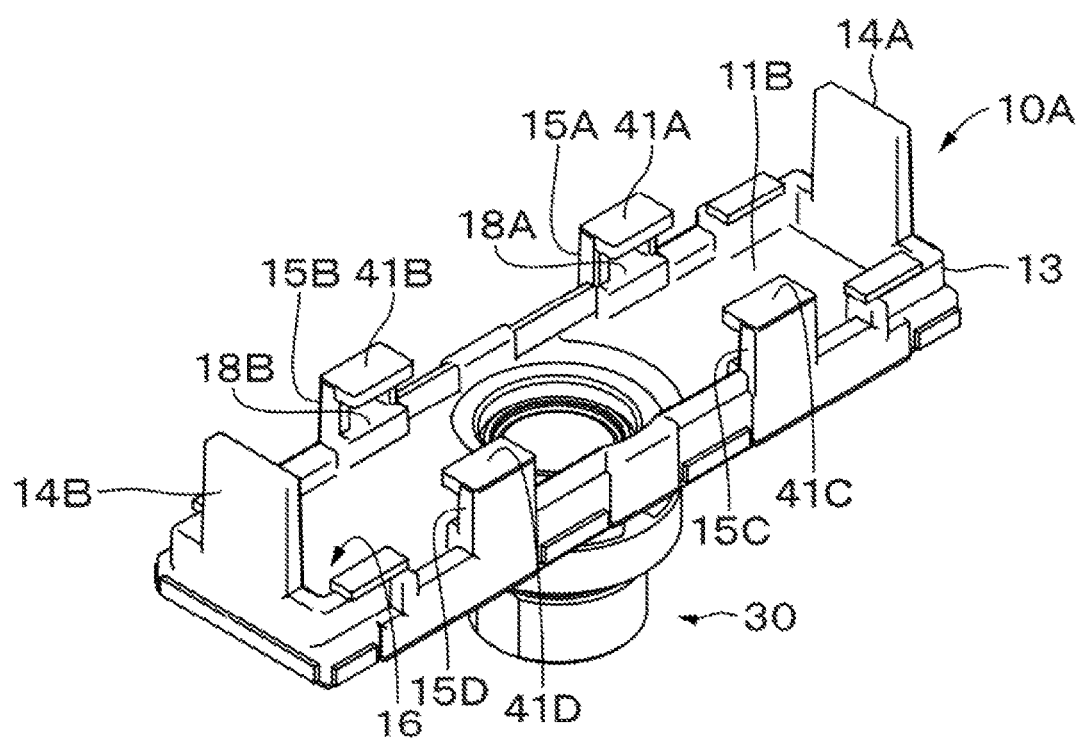
FIG. 7C is another perspective view illustrating the housing according to the second embodiment seen from another angle.
Figure 8A:
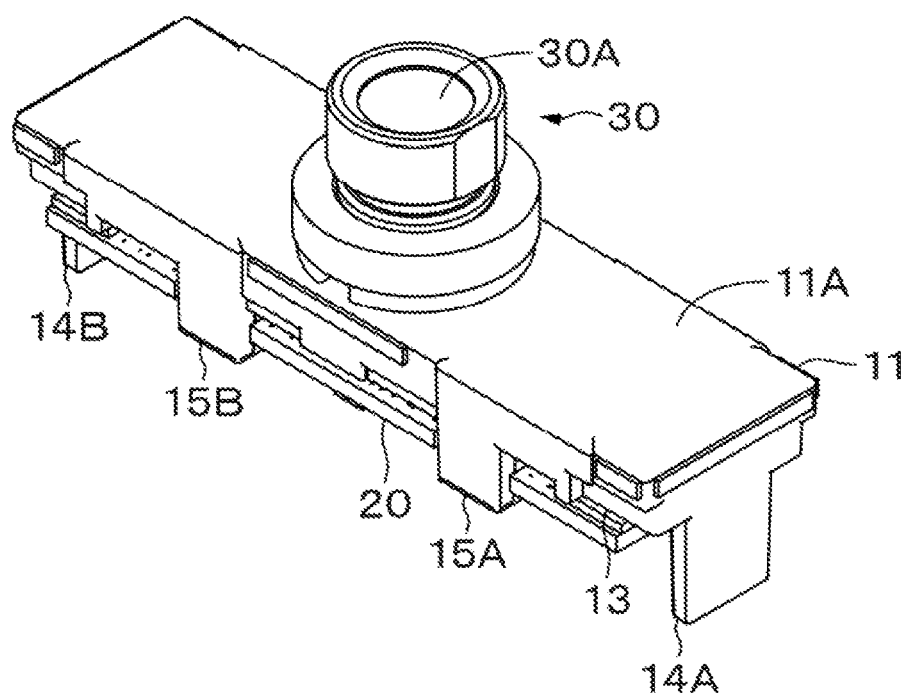
FIG. 8A is a perspective view illustrating a camera module according to the second embodiment seen from an angle.
Figure 8B:
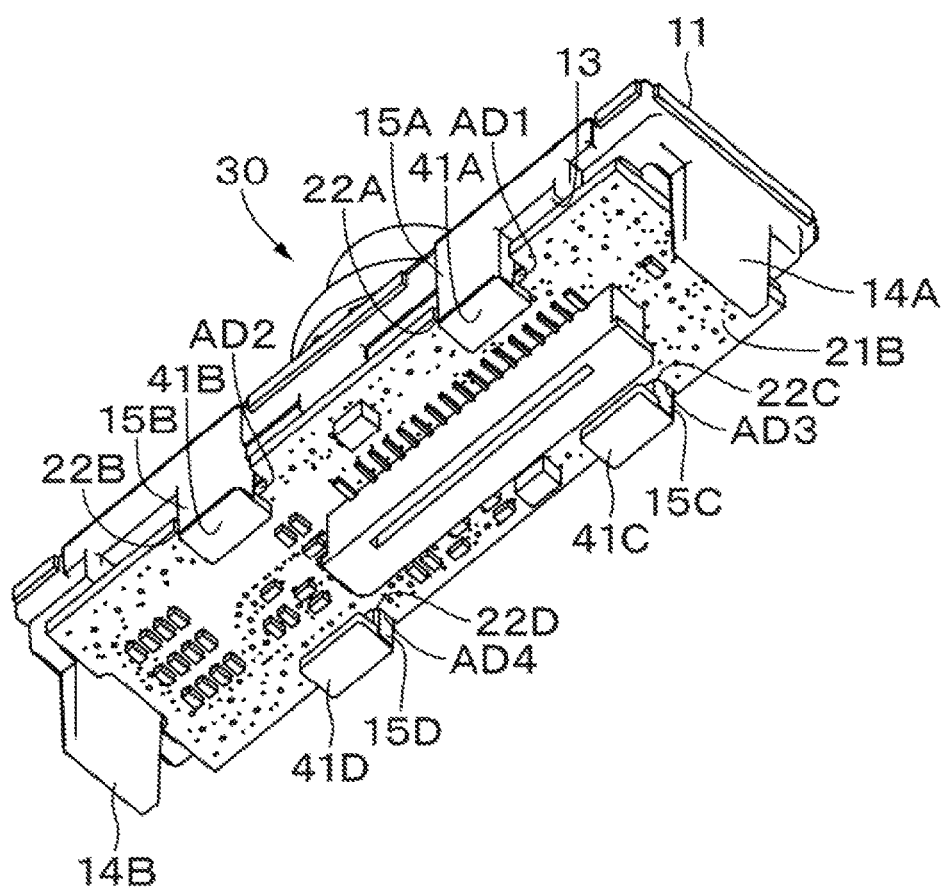
FIG. 8B is another perspective view illustrating the camera module according to the second embodiment seen from another angle.
Figure 8C:
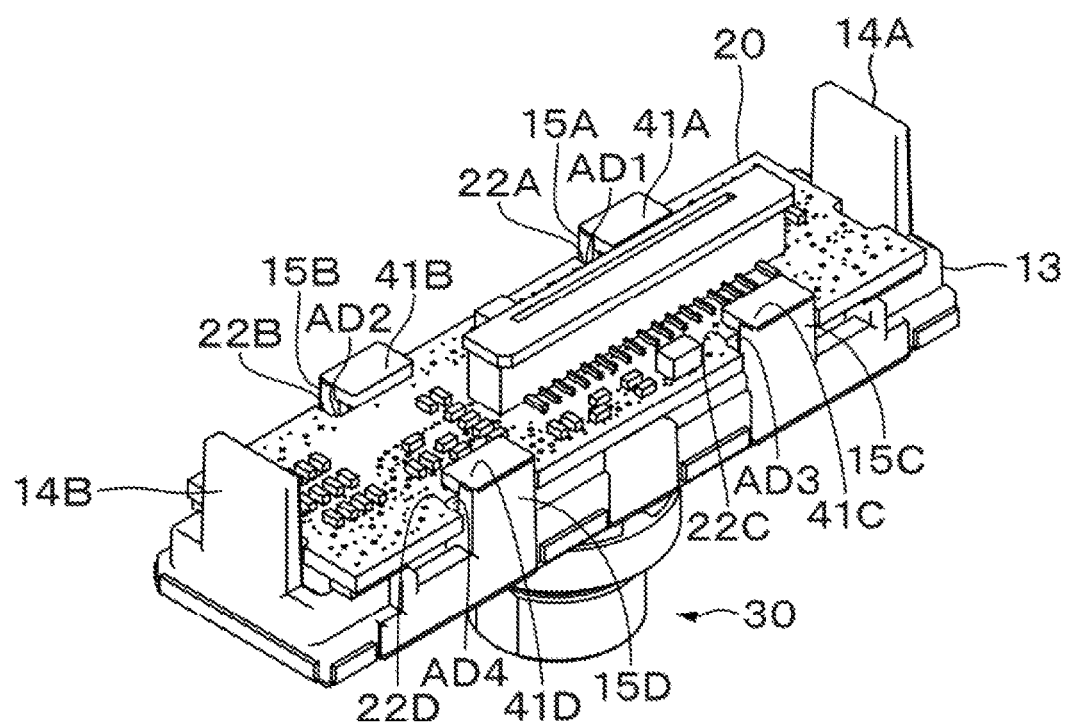
FIG. 8C is another perspective view illustrating the camera module according to the second embodiment seen from another angle.

FIGS. 7A to 7C are perspective views illustrating the housing (housing 10A) according to the second embodiment seen from different directions, and FIGS. 8A to 8C illustrate a state in which the housing 10A and the substrate 20 are bonded to each other. The difference between the housing 10A according to the second embodiment and the housing 10b according to the first embodiment is that a roof part 41 is provided at a tip of the wall 15. More specifically, a roof part 41A is provided at a tip of the wall 15A. The roof part 41A is a plate-like part substantially parallel to the adhesive agent pool 18A. A roof part 41B is provided at a tip of the wall 15B. The roof part 41B is a plate-like part substantially parallel to the adhesive agent pool 18B. A roof part 41C is provided at a tip of the wall 15C. The roof part 41C is a plate-like part substantially parallel to the adhesive agent pool 18C. A roof part 41D is provided at a tip of the wall 15D. The roof part 41D is a plate-like part substantially parallel to the adhesive agent pool 18D. Note that, the inner surface of the wall 15 (surface of the substrate housing 16 side) may be concave portion as with the first embodiment or may be flat.

After the position of the housing 10A and the substrate 20 is adjusted, the end of the substrate 20 is located between the adhesive agent pool 18 and the roof part 41. Adhesive agent is injected in that state and the housing 10A and the substrate 20 are bonded and fixed to each other by the adhesion part formed as a result of curing of the adhesive agent. The adhesion part AD according to the second embodiment includes four adhesion parts AD1 to AD4 as with the first embodiment.

Figure 9A:
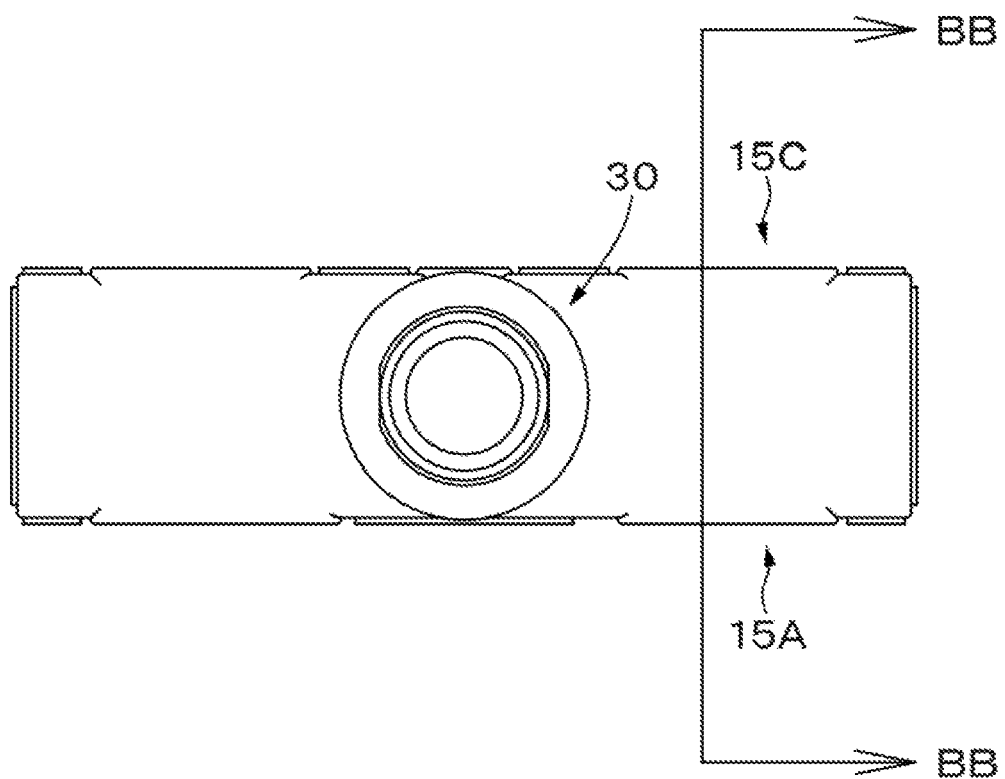
FIG. 9A shows the section line BB-BB.
Figure 9B:
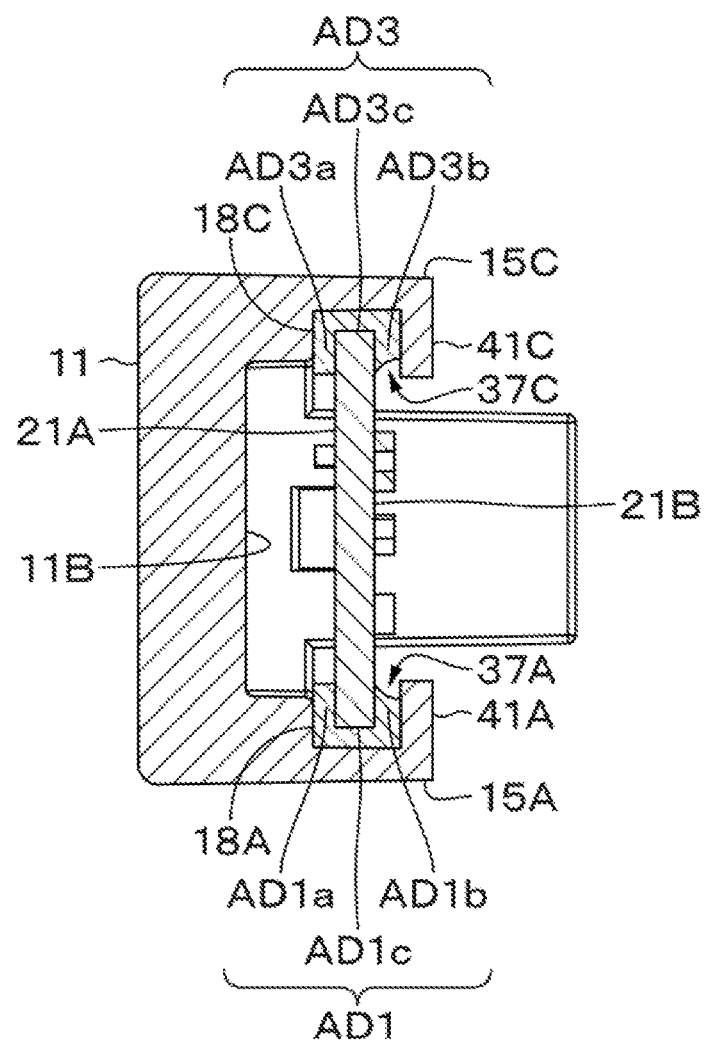
FIG. 9B is a cross-sectional view illustrating a cross section when the camera module is cut according to the section line BB-BB.

The adhesion part according to the second embodiment will be described with reference to FIGS. 9A and 9B. FIG. 9B is a cross-sectional view illustrating the housing 10A cut by the section line BB-BB shown in FIG. 9A passing the walls 15A and 15C and extending along the short direction of the plate portion 11.

As with the first embodiment, an opposing space is formed between the main plane 21A of the substrate 20 and the adhesive agent pool 18A and an adhesion part AD1a is formed by filling the opposing space with adhesive agent. On the other hand, an opposing space is formed between the main plane 21B of the substrate 20 and the roof part 41A and the adhesive agent injected in the opposing space is regulated by a roof part 41A to be stored. That is, the roof part 41A functions as a second adhesive agent pool. Then, an adhesion part AD1b is formed by curing of the adhesive agent.

While at least the two opposing spaces described above need to be filled with adhesive agent, in the present embodiment, an adhesion part AD1c is formed as a result of filling of the space including the opposing space between the side surface of the substrate 20 and the inner surface of the wall 15A, that is, the space connecting to both opposing spaces, with adhesive agent. As described, the adhesion part AD1 according to the second embodiment has a U-shape cross section including the adhesion parts AD1a, AD1b, and AD1c. This is the same with other adhesion parts AD2 to AD4, and the adhesion parts AD2 to AD4 have U-shape cross section.

Moreover, in the present embodiment, the adhesive agent pool 18A and the roof part 41A are formed and the amount of adhesive agent to be injected is set so that the amount of the adhesive agent forming the adhesion part AD1a is almost the same with that of the adhesion part AD1b assuming schematic positional relationship between the housing 10A and the substrate 20. Although it depends on kind of adhesive agent, adhesive agent with fluidity may be contracted by several % for example, when being cured. Relative positional relationship between the housing 10A and the substrate 20 may be changed because the substrate 20 is pulled and the position thereof is changed due to contraction of the adhesive agent. However, in the present embodiment, since the movement accompanying the contraction of the adhesion part AD1a and that of the adhesion part AD1b are compensated because the amount of adhesive agent forming the adhesion part AD1a is almost the same as that of the adhesion part AD1b, it is possible to prevent displacement of the substrate 20 as much as possible. Note that, the force applied in the horizontal direction accompanying the contraction of the adhesion part AD1c is compensated because the adhesion part AD3c is also formed opposite to the adhesion part AD1c (See FIG. 6B), and it is possible to prevent displacement of the substrate 20 as much as possible.

A method for producing the camera module 100A according to the second embodiment will be described. The position between the housing 10A and the substrate 20 is adjusted by a known six-axes adjustment device. After the adjustment of the position, adhesive agent is injected. For example, an open end located near the tip of the roof part 41A is the adhesive agent injection portion 37A and adhesive agent is injected from the adhesive agent injection portion 37A. After the injected adhesive agent enters a U-shape adhesive agent path and reaches an opposing space between the main plane 21A of the substrate 20 and the adhesive agent pool 18A, the adhesion part AD1 is formed as a result of curing of the adhesive agent. Similarly, adhesion parts AD2 to AD4 are formed, and the adhesion part AD according to the second embodiment is formed. According to the configuration of the second embodiment, the adhesion part AD1 including the adhesion parts AD1*a*, AD1*b*, and AD1*c* can be formed by one step. In addition, if adhesive agent is injected to each adhesive agent path at the same time, a configuration of a camera module with excellent shock resistance and that can prevent displacement of the substrate 20 as much as possible can be easily produced by one adhesive agent injection step.

3. Modification

While the embodiments of an aspect of the present invention have been specifically described above, the present invention is not limited to the embodiments described above and various modifications are possible.

The number of walls, adhesion points, and the like in the embodiments described above is not limited to four, but can be changed as appropriate according to application or the like of a camera module. In addition, the camera module according to an aspect of the present invention can be used for various applications such as sensing like in-vehicle camera, robot, medical equipment, and commercial camera.

The configurations, methods, steps, shapes, materials, numerical values, and the like described in the above embodiments and modification are merely examples. Different configurations, methods, steps, shapes, materials, numerical values, and the like may be used as necessary and they can be replaced by known ones. In addition, the configurations, methods, steps, shapes, materials, numerical values, and the like in the embodiments and modification can be combined with each other as long as technical contradictions do not occur.

REFERENCE SIGNS LIST

10 Housing
15A to 15D Wall
17A to 17D, 37A to 37D Adhesive agent injection portion
18A to 18D Adhesive agent pool
20 Substrate
21A, 21B Main plane
30 Lens unit
AD1 to AD4 Adhesion part
41A to 41D Roof part
100 Camera module

The invention claimed is:

1. A camera module comprising:
   a housing to which a lens unit is attached; and
   a substrate mounting an imaging element on a first main plane and supported by the housing so that the imaging element is irradiated with a light taken via the lens unit and the imaging element has a certain positional relationship with an optical axis of the lens unit, wherein the housing includes:
   an adhesive agent pool having a plane provided substantially parallel to the first main plane of the substrate and provided to the first main plane with a certain first opposing space; and
   a wall provided in a direction substantially perpendicular to the plane of the adhesive agent pool and having a concave portion that connects to the first opposing space and makes a part of an adhesive agent path including the first opposing space, the concave portion forming an open end of the adhesive agent path provided to a side of a second main plane of the substrate, and wherein
   the camera module further comprises an adhesion part running continuously from the first main plane of the substrate to the second main plane of the substrate and filling a space along the concave portion of the wall from the first opposing space, and further filling the first opposing space, thus bonding the housing in fixed relation to the substrate.

2. The camera module according to claim 1, wherein the camera module includes several of the adhesive agent pools.

3. The camera module according to claim 1, further comprising:
   another adhesive agent pool having a plane provided substantially parallel to the second main plane of the substrate and provided to the second main plane with a second opposing space,
   wherein the adhesion part is provided to at least the first opposing space and the second opposing space.

4. The camera module according to claim 3, wherein the adhesion part is provided to a space connecting to the first opposing space and the second opposing space.

5. The camera module according to claim 3, wherein adhesion parts formed by substantially a same amount of adhesive agent are provided to the first opposing space and the second opposing space.

6. A method for producing a camera module comprising a housing to which a lens unit is attached and a substrate mounting an imaging element on a first main plane and supported by the housing so that the imaging element is irradiated with a light taken via the lens unit and the imaging element has a certain positional relationship with an optical axis of the lens unit, the housing including an adhesive agent pool having a plane provided substantially parallel to the first main plane of the substrate and provided to the first main plane with a certain opposing space and a wall provided in a direction substantially perpendicular to the plane of the adhesive agent pool and having a concave portion that connects to the opposing space and makes a part of an adhesive agent path including the opposing space, the concave portion forming an open end of the adhesive agent path provided to a side of a second main plane of the substrate, the camera module further comprising an adhesion part running continuously from the first main plane of the substrate to the second main plane of the substrate and filling a space along the concave portion of the wall from the opposing space, and further filling the opposing space, thus bonding the housing in fixed relation to the substrate, comprising:
   adjusting relative positional relationship between the housing and the substrate; and
   injecting adhesive agent from an open end of the adhesive agent path and injecting the adhesive agent from the open end toward the opposing space to bond the housing and the substrate.

* * * * *